United States Patent
Badding et al.

(10) Patent No.: US 9,905,883 B2
(45) Date of Patent: Feb. 27, 2018

(54) CERAMIC ELECTROLYTE MATERIAL COMPRISING A MODIFIED POLYCRYSTALLINE LITHIUM METAL PHOSPHATE

(71) Applicant: Corning Incorporated, Corning, NY (US)

(72) Inventors: Michael Edward Badding, Campbell, NY (US); Jacqueline Leslie Brown, Lindley, NY (US); Lanrik Wayne Kester, Savona, NY (US); Xinyuan Liu, Corning, NY (US)

(73) Assignee: Corning Incorporated, Corning, NY (US)

( * ) Notice: Subject to any disclaimer, the term of this patent is extended or adjusted under 35 U.S.C. 154(b) by 861 days.

(21) Appl. No.: 13/852,491

(22) Filed: Mar. 28, 2013

(65) Prior Publication Data
US 2014/0295286 A1    Oct. 2, 2014

(51) Int. Cl.
*H01M 10/0562* (2010.01)
*H01M 2/14* (2006.01)
(Continued)

(52) U.S. Cl.
CPC ....... *H01M 10/0562* (2013.01); *H01M 2/145* (2013.01); *H01M 2/1646* (2013.01);
(Continued)

(58) Field of Classification Search
CPC ........... H01M 10/0562; H01M 10/052; H01M 10/0525; Y02E 60/122
See application file for complete search history.

(56) References Cited

U.S. PATENT DOCUMENTS

| 4,496,639 A | 1/1985 | Rasmussen et al. ........... 429/193 |
| 6,765,721 B2 | 7/2004 | Kawazu et al. .............. 359/492 |

(Continued)

FOREIGN PATENT DOCUMENTS

DE    4119498    12/1992

OTHER PUBLICATIONS

J.S. Thokchom, et al., "Composite effect in Superionically Conducting Lithium Aluminium Germanium Phosphate Based Glass-Ceramic", Journal of Power Sources, 2008, vol. 185, pp. 480-485.
(Continued)

*Primary Examiner* — Jimmy K Vo
(74) *Attorney, Agent, or Firm* — John L. Haack

(57) ABSTRACT

There is disclosed a polycrystalline lithium-ion conductive membrane for a lithium-air battery that comprises at least one surface, a polycrystalline lithium-ion conductive material comprising grain boundaries, and at least one modifying phase, wherein (a) the at least one modifying phase is incorporated into the grain boundaries to form a modified polycrystalline lithium-ion conductive material comprising modified grain boundaries, (b) the at least one modifying phase is incorporated into the at least one surface to form a modified surface, or both (a) and (b). Various lithium based batteries, including lithium ion, lithium-air, and lithium-water batteries are disclosed, as well as methods for modifying the polycrystalline lithium-ion conductive membrane to allow it to be used in such battery applications.

23 Claims, 12 Drawing Sheets

(51) Int. Cl.
H01M 2/16 (2006.01)
H01M 10/052 (2010.01)
H01M 10/0525 (2010.01)
H01M 12/06 (2006.01)

(52) U.S. Cl.
CPC ..... *H01M 10/052* (2013.01); *H01M 10/0525* (2013.01); *H01M 12/06* (2013.01); *Y02T 10/7011* (2013.01)

(56) References Cited

U.S. PATENT DOCUMENTS

| | | | | |
|---|---|---|---|---|
| 6,788,376 | B2 | 9/2004 | Izumi et al. | 349/139 |
| 7,261,833 | B2 | 8/2007 | Seabaugh et al. | 252/62.2 |
| 7,682,740 | B2 | 3/2010 | Yong et al. | 429/217 |
| 7,871,735 | B2 | 1/2011 | Seabaugh et al. | 429/491 |
| 2001/0012590 | A1 | 8/2001 | Ehrlich | 429/303 |
| 2005/0266150 | A1 | 12/2005 | Yong et al. | 427/58 |
| 2007/0117007 | A1 | 5/2007 | Visco et al. | 429/144 |
| 2008/0292968 | A1* | 11/2008 | Lee | H01M 2/14 429/247 |
| 2009/0075146 | A1 | 3/2009 | Striker et al. | 429/33 |
| 2012/0231350 | A1 | 9/2012 | Nishida et al. | |

OTHER PUBLICATIONS

PCT Application No. PCT/US2014/031405, Filed Mar. 21, 2014, PCT Search Report and Written Opinion.

G.Y. Aleshin, et al., "Protected anodes for lithium-air batteries", *Solid State Ionics*, 2011, vol. 184, pp. 62-64.

M. Cretin, et al., "study of $Li_{1+x}Al_xTi_{2-x}(PO_4)_3$ for $Li^+$ Potentiometric Sensors", *Journal of European Ceramic Society*; 1995, vol. 15, pp. 1149-1156.

K. Dokko, et al., "Preparation of LiMn2O4 thin-film electrode on $Li_{1+x}Al_xTi_{2-4}(PO_4)_3$ NASICON-type solid electrolyte", *Journal of Power Sources*, 2007, vol. 174, pp. 1100-1103.

K. Duan, et al., "Surface modifications of bone implants through wet chemistry", *Journal of Materials Chemistry*, 2006, vol. 16, pp. 2309-2321.

B.D. Fabes, et al., "Strengthening of Glass by Sol-Gel Coatings", *Journal of the American Ceramic Society*, 1990, vol. 73, No. 4, pp. 978-988.

G. Girishkumar, et al., "Lithium-Air Battery: Promise and Challenges", *The Journal of Physical Chemistry Letters*, 2010, vol. 1 pp. 2193-2203.

C.K.F. Ho, et al., "Optical and physical properties of solgel-derived $GeO_2$:$SiO_2$ films in photonic applications", *Applied Optics*, 2007, vol. 46, No. 10, pp. 4397-4406.

C.H. Hsu, et al., "Microstructural, optical and electrical properties of GeO2 thin films prepared by sol-gel method", *Cryst. Res. Technol.*, 2011, vol. 46, No. 1, pp. 65-68.

N. Imanishi, et al., "Lithium anode for lithium-air secondary batteries", *Journal of Power Sources*, 2008, pp. 1392-1397.

T. Katob, et al., "Lithium/water battery with lithium ion conducting glass-ceramics electrolyte", *Journal of Power Sources*, 2011, vol. 196, pp. 6877-6880.

S.O. Kucheyev, et al, "Monolithic, high surface area, three-dimensional $GeO_2$ nanostructures", *Applied Physics Letters*, 2006, vol. 88, pp. 103117-1-103117-3.

Y. Liang, et al., "Fabrication and characterization of LATP/PAN composite fiber-based lithium-ion battery separators", *Electrochimica Acta*, 2011, pp. 6474-6480.

A.M. Lipski, et al., "Nanoscale Engineering of Biomaterial Surfaces", *Advanced Materials*, 2007, vol. 19, pp. 553-557.

K. Takada, et al., "Sol-gel preparation of Li+ ion conduct think film", *Applied Surface Science*, 2002, pp. 300-306.

J. Thokchom, et al., "Water Durable Lithium Ion Conducting Composite Membranes from the $Li_2O$—$Al_2O_3$—$TiO_2$—$P_2O_5$ Glass-Ceramic", *Journal of the Electrochemical Society*, 2007, vol. 154, No. 4, pp. A331-A336.

S.J. Visco, et al., "Lithium-Air", *Secondary Batteries-Metal-Air Systems Lithium-Air*, pp. 376-383.

P. Viswanathamurthi, et al., GeO2 fibers: Preparation, morphology and Photoluminescence property, *The Journal of Chemical Physics*, 2004, vol. 121, pp. 441-445.

X. Wu, et al., "Synthesis and Characterization of $Li_{1.3}Al_{0.3}Ti_{1.7}(PO_4)_3$-coated LiMn2O4 by wet chemical route", *Rare Metals*, 2009, vol. 28, No. 2, pp. 122-126.

English Translation of CN201480017952.2 First Office Action dated Mar. 24, 2017, China Patent Office.

* cited by examiner

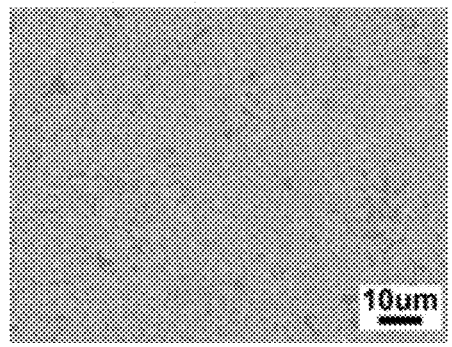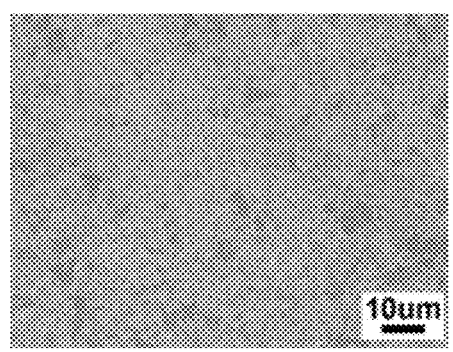
FIG. 5A    FIG. 5B
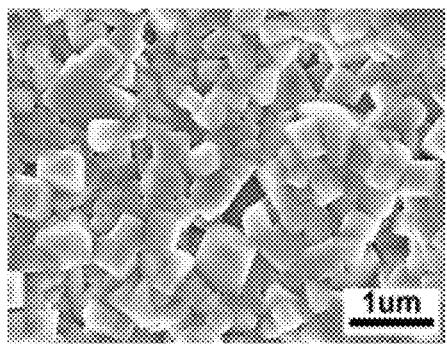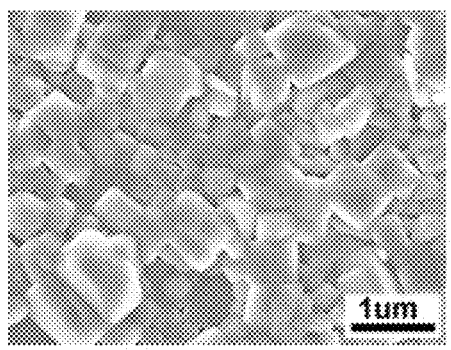
FIG. 5C    FIG. 5D

CERAMIC ELECTROLYTE MATERIAL COMPRISING A MODIFIED POLYCRYSTALLINE LITHIUM METAL PHOSPHATE

FIELD

The disclosure relates generally to modified polycrystalline materials for use as solid electrolytes in lithium-air cells. Exemplary embodiments include polycrystalline materials having an increased concentration of at least one modifying phase at a surface or along the grain boundaries of the polycrystalline materials. Lithium batteries made with the disclosed polycrystalline materials, as well as methods of making the modified polycrystalline materials are also disclosed.

BACKGROUND

Lithium batteries have high theoretical energy densities and specific capacities, and have therefore attracted worldwide attention for potential applications in hybrid and advanced electric vehicles and renewable energies.

In either a lithium-air ("Li-air"), lithium-water ("Li-water"), or hybrid Li-air/Li-water batteries, a lithium metal anode may be used, and is often preferred due to favorable electrochemical properties. However, lithium metal is a reactive alkali metal that is highly reactive with water, and it is beneficial to isolate the lithium metal from the environment. One approach may include using a solid electrolyte that provides a hermetic seal between the anode and cathode.

Prior solid electrolytes have shown poor environmental stability, for example dissolving, degrading, or exhibiting reduced conductivity when exposed to or immersed in water. This poor environmental stability can result in not only decreased battery performance, but also potential safety issues if the compromised hermetic seal allows moisture to reach the lithium metal anode. Therefore, it is desirable to improve the environmental stability of solid electrolytes.

SUMMARY

The disclosure relates, in various embodiments, to a polycrystalline lithium-ion conductive membrane for use as a solid electrolyte for a lithium-air ("Li-air"), lithium-water ("Li-water"), and/or hybrid Li-air/Li-water cell. The polycrystalline lithium-ion conductive membrane comprises at least one surface and a plurality of grains having grain boundaries, and further comprises at least one modifying phase selected from metal oxides or phosphates, wherein the metal is Ge, Al, Ca, Y, Si, Mg, Ga or any other metal capable of forming divalent cations, trivalent cations, quadrivalent cations, and/or pentavalent cations, as well as combinations thereof, wherein the at least one modifying phase is: incorporated into the grain boundaries to form a modified polycrystalline lithium-ion conductive material comprising modified grain boundaries, incorporated into the at least one surface to form a modified surface, or incorporated into both the grain boundaries and into at least one surface.

In various embodiments, the polycrystalline lithium-ion conductive membrane exhibits a lower rate of etching by water than the unmodified polycrystalline lithium-ion conductive material, and/or a higher electrical conductivity than the unmodified polycrystalline lithium-ion conductive material. In certain embodiments, the modified grain boundaries exhibit a lower rate of etching by water than grain boundaries of the polycrystalline lithium-ion conductive material.

In one embodiment, the polycrystalline lithium-ion conductive material is a lithium metal phosphate comprising $Li_{1+x}Al_xTi_{2-x}(PO_4)_3$, where $0<x<0.6$. In one embodiment, the modified surface phase comprises $Li_{1+x}Al_xGe_yTi_{2-x-y}(PO_4)_3$, where $0<x<0.6$ and $0<y<2$, and the modified grain boundary phases comprises an oxide or phosphate phase or phases enriched in germanium, e.g., $GeO_2$.

In various embodiments, the modified surface is less than about 15 microns thick. In one embodiment, the polycrystalline lithium-ion conductive membrane comprises two modified surfaces located on two opposite surfaces of the modified polycrystalline lithium-ion conductive membrane to form a structure having a gradient in the modifying phase concentration, wherein the concentration is higher at the opposite sides than in the center of the structure.

In various embodiments, the polycrystalline lithium-ion conductive material exhibits a density of at least 92% of the theoretical density of the polycrystalline lithium-ion conductive material, has a thickness of about 5 µm to about 500 µm, is hermetic such that diffusion of helium through the polycrystalline lithium-ion conductive membrane is less than about $10^{-2}$ cm$^3$/m$^2$/day, and/or has a conductivity of greater than about $10^{-4}$ S/cm.

A lithium battery comprising the polycrystalline lithium-ion conductive membrane as a solid electrolyte is also disclosed. The lithium battery may be a lithium ion battery, a lithium-air battery and/or a lithium-water battery.

Also disclosed is a method for modifying a polycrystalline lithium-ion conductive membrane. The method comprises preparing a composition comprising a metal oxide or phosphate or a precursor thereof, wherein the metal is Ge, Al, Ca, Y, Si, Mg, Ga or any other metal capable of forming divalent cations, trivalent cations, quadrivalent cations, and/or pentavalent cations; and combinations thereof; forming a coated polycrystalline lithium-ion conductive membrane by applying the composition to at least one surface of the polycrystalline lithium-ion conductive membrane; and annealing the coated polycrystalline lithium-ion conductive membrane to form a modified surface comprising the modifying phase, modified grain boundaries comprising the modifying phase, or both a modified surface and modified grain boundaries.

In one embodiment, the composition comprises $GeO_2$ particles made by a sol-gel process using a germanium isopropoxide precursor. The $GeO_2$ particles may have an average particle size ranging from 20-100 nm.

In one embodiment, the annealing is performed for a time ranging from about 0.5-12 hours in a furnace having a temperature ranging from about 700° C. to about 1000° C.

Additional objects and advantages will be set forth in part in the description which follows, and in part will be obvious from the description, or may be learned by practice of the disclosure. The objects and advantages will be realized and attained by means of the elements and combinations particularly pointed out in the appended claims.

It is to be understood that both the foregoing general description and the following detailed description are exemplary and explanatory only and are not restrictive of the disclosure, as claimed.

The accompanying drawings, which are incorporated in and constitute a part of this specification, illustrate several embodiments and together with the description, serve to explain the principles of the disclosure.

BRIEF DESCRIPTION OF THE DRAWINGS

FIG. 5A-5D shows SEM images of the surface of a) unmodified LATP materials according to Comparative Example 1 and b) modified LATP materials according to Example 1 and SEM images of a fractured cross section of c) unmodified LATP materials according to Comparative Example 1 and d) modified LATP materials according to Example 1;

DESCRIPTION OF THE EMBODIMENTS

Figure 1:
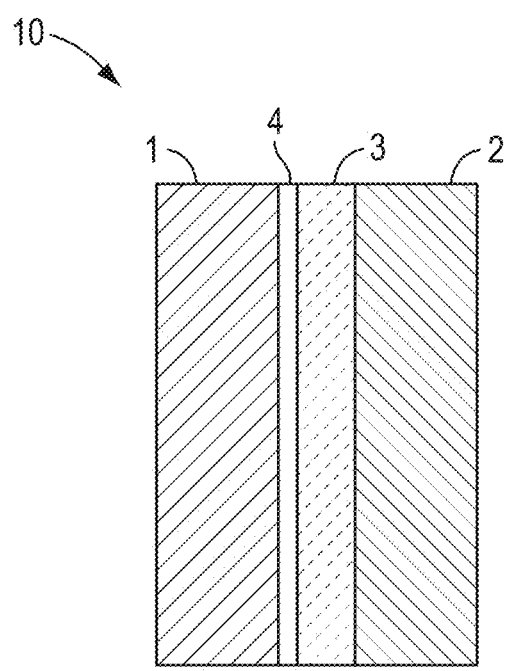
FIG. 1 is a schematic of a lithium-air ("Li-air"), lithium-water ("Li-water"), and/or hybrid Li-air/Li-water cell according to one embodiment.

Reference will now be made in detail to the present embodiments of the disclosure, examples of which are illustrated in the accompanying drawings. Wherever possible, the same reference numbers will be used throughout the drawings to refer to the same or like parts.

As used herein, the terms "lithium-air cell," "Li-air cell," "Li-air battery," and variations thereof, mean an electrochemical cell including a lithium-based electrode, for example an anode; an electrolyte; and a porous electrode, for example a cathode, open to air or a gas containing an oxidant.

As used herein, the terms "lithium-water cell," "Li-water cell," "Li-water battery," and variations thereof, mean an electrochemical cell including a lithium-based electrode, for example an anode; an electrolyte; and an electrode, for example a cathode open to water or an aqueous solution containing an oxidant.

As used herein, the terms "lithium-ion cell," "Li-ion cell," "Li-ion battery," and variations thereof, mean an electrochemical cell including an intercalated lithium compound-based electrode, for example an anode; an electrolyte; and an electrode, for example a cathode.

As used herein, the term "electrolyte," and variations thereof, means a material that allows for the transport of lithium ions.

As used herein, the terms "cathode," "air electrode," "water electrode," and variations thereof, mean an electrode of a Li-air cell, Li-water, and/or hybrid Li-air/Li-water cell where reduction of oxygen takes place during discharge of the cell, and production of $O_2$ takes place during charging of the cell.

As used herein, the term "modifying phase" and variations thereof, means a solid state material having an overall composition different than the composition of the bulk material being modified.

As used herein, the term "polycrystalline," and variations thereof, means a material composed of many grains or crystallites of varying size and orientation. As used herein, the term "grain boundary," and variations thereof, means the interface between two grains or crystallites in a polycrystalline material.

As used herein, the term "hermetic," and variations thereof, means a material that is substantially airtight and/or is substantially impervious to moisture.

The disclosure relates, in various exemplary embodiments, to modified polycrystalline material for use as a solid electrolyte for lithium-air ("Li-air"), lithium-water ("Li-water"), and/or hybrid Li-air/Li-water cells. Modification of the polycrystalline material with a modifying phase can result in grain boundaries modified with the modifying phase and/or a surface or region modified with the modifying phase, a modified polycrystalline material exhibiting a lower rate of etching by water than an unmodified polycrystalline material, and/or a higher electrical conductivity than the unmodified polycrystalline material. In certain embodiments, the lower rate of etching of the modified polycrystalline material is at least partially due to the modified grain boundaries exhibiting a lower rate of etching by water than grain boundaries of the unmodified polycrystalline material.

Among many practical electrochemical couples, Li-air has the largest specific capacity and energy density. The Li-air battery has a theoretical specific energy density of 5,800-11,400 Wh/kg depending on the nature of the electrolyte and reaction products, which far exceeds the lithium ion theoretical energy of about 400 Wh/kg. Li-air cells have therefore attracted worldwide attention, and have great potential applications in hybrid and advanced electric vehicles and renewable energies.

In a Li-air cell, lithium is oxidized at a lithium metal anode and oxygen, taken directly from the environment, is reduced at an air cathode to generate current during discharge. An electrolyte transports lithium ions between the electrodes. There are four major types of Li-air cells, including aprotic, aqueous, mixed aqueous-aprotic, and solid state. Aprotic Li-air cells generally include a lithium metal anode, a liquid organic and/or non-aqueous electrolyte, and a porous carbon cathode. Aqueous Li-air cells are similar to aprotic cells, except an aqueous electrolyte is used. Mixed aqueous-aprotic Li-air cells typically include an organic electrolyte on the lithium metal anode side, an aqueous electrolyte on the cathode side, and a lithium-conducting membrane separating the organic electrolyte from the aqueous electrolyte. A solid state Li-air cell includes a lithium anode, a solid electrolyte made from ceramic and/or glass, and a porous carbon cathode.

A Li-water cell also has a very high energy density and large specific capacity. In a Li-water battery, lithium is oxidized at a lithium-metal anode and oxygen, taken from water or an aqueous solution such as salt water or seawater, is reduced at a water cathode to generate current during discharge. As in Li-air batteries, an electrolyte transports lithium ions between the electrodes. One type of Li-water battery is a hybrid Li-air/Li-water cell, which incorporates a Li-air side including a lithium metal anode and an optional solid or liquid interface, and a Li-water side including a solid electrolyte and a water cathode. The optional solid or liquid interlayer, situated between the lithium metal anode and the solid electrolyte or between the lithium metal anode and the cathode, can isolate the lithium metal anode from the Li-water side.

In either a Li-air, Li-water, or hybrid Li-air/Li-water cell, a lithium metal anode may be used, and is often preferred due to favorable electrochemical properties. However, lithium metal is a reactive alkali metal that is highly reactive with water, and it is imperative that moisture be kept away from the lithium metal anode. Attractive electrical performance results with Li-air batteries have been shown, though those were obtained under dry pure oxygen or dry oxygen and nitrogen mixture gas. In many practical applications, for example electric vehicles, it would be difficult to avoid all moisture in air on the air cathode, and the electrolyte may also contain water, either inherently or through transport of water from the cathode. The moisture content from water cathodes should likewise be sequestered from the lithium metal anode.

Therefore, a challenge that may limit the practical use of Li-air, Li-water, and hybrid Li-air/Li-water batteries for practical operation is the stability of a lithium anode in conditions containing water and/or moisture. One solution to this challenge may include using a solid electrolyte that provides a hermetic seal between the anode and cathode.

The cathode can be an air cathode open to air or any other gas containing an oxidant, for example oxygen, or a water cathode open to water or an aqueous solution containing an oxidant, for example oxygen. Moisture from the air, gas, water and/or aqueous solution can permeate the cathode and reach the solid electrolyte. Therefore, another challenge that limits the practical use and Li-air, Li-water and hybrid Li-air/Li-water batteries for practical operation is the stability of the solid electrolyte in conditions containing water and/or moisture.

One proposed solution includes forming a protected lithium electrode ("PLE") with a water-stable lithium conducting solid electrolyte based on the NASICON-type $LiM_2(PO_4)_3$, where M is Ti, Ge, Sn, Zr, and/or Hf. This structure consists of an open three-dimensional framework of $MO_6$ octahedra and $PO_4$ tetrahedra. These polyhedra are linked by their corners to form a $[M_2(PO_4)_3]^-$ rigid skeleton that provides three-dimensional channels through which lithium ions can migrate. The key component in the PLE battery system is the solid electrolyte that requires high lithium conductivity, hermetic membrane and high stability in water. FIG. 1 shows a schematic of a protected lithium electrode (PLE) battery. However, the lack of a suitable and water stable solid electrolyte has impeded the development of such PLE batteries.

It is known that stability of a solid electrolyte including Li, Al, Ti and P can be adversely affected when exposed to water. For example, the solid electrolyte $Li_{1+x+y}Al_xTi_{2-x}P_{3-y}Si_yO_{12}$ exhibits a degradation in conductivity after immersion in water for 1 month or how sol-gel processed LATP $(Li_{1.3}Al_{0.3}Ti_{1.7}(PO_4)_3)$ can lose a significant amount of its weight after immersion in distilled water for 100 hours. Even small degradations in LATP membranes prepared by a glass-ceramic process have occurred after 65 days of exposure to tap water.

A ceramic membrane of $Li_{1.4}Al_{0.4}Ti_{1.6}(PO_4)_3$ ("LATP"), a derivative of $LiTi_2(PO_4)_3$, exhibits a high conductivity of $>10^{-4}$ S/cm, low porosity, and no leaks through dye testing. However, stability testing of the LATP membranes as a lithium battery ceramic electrolyte has shown that LATP membranes leached out significant amounts of lithium and phosphorus due to dissolution when tested in aqueous electrolyte at room temperature.

An alternative solid electrolyte membrane, $Li_{1.4}Al_{0.4}Ti_{1.6}(PO_4)_3$ ("LAGP"), has demonstrated low leaching in aqueous electrolyte tests exceeding 2000 hours. LAGP is therefore a promising ceramic electrolyte with high stability for use in a Li-air, Li-water and/or hybrid Li-air/Li-water cell. However, the high cost of germanium used to prepare LAGP can lower its low economic efficiency and prohibit its large-scale commercial viability.

Therefore, it is desirable to modify an LATP membrane, for example by surface modification, to improve its environmental stability rather than change the bulk composition and structure of the ceramic electrolyte.

Current surface modification strategies can be broadly classified into three categories: 1) those that add desirable material functions to the surface, 2) those that convert the existing surface into more desirable compositions and/or topographies, and 3) those that alter surface topographies by removing surface materials. A variety of physical and chemical techniques have been applied to modify surfaces including physical vapor deposition, plasma spray coating, ion implantation, surface machining, grit-blasting, pulsed laser deposition, compression-molding processes, nano- and micro-indentation, sputtering, electrochemical deposition, chemical vapor deposition, chemical etching, sol-gel process, and polymer adsorption.

Among these techniques, the sol-gel process is very attractive due to its unique features. Compared with physical vapor deposition or chemical vapor deposition methods, sol-gel technology does not require any high vacuum systems and has several other advantages, such as ease of applying coatings on various substrates; possibility of coating large area substrates; cost effectiveness; small amounts of precursor required; a resulting thin, dense and homogenous film; low temperature process; coatings exhibiting low cracking; strong adhesion to substrates; and great potential to alter surface material properties.

Various sol-gel methods may be sued to prepare $GeO_2$, including methods that use germanium isopropoxide and 2-propanol, which involve spin depositing a precursor sol on ITO and/or glass substrates, and annealing the resulting films at various temperatures from 500° C. to 700° C. In addition, micron-scale to submicron fibers of $GeO_2$ can be synthesized using poly(vinyl acetate) and germanium dioxide sol by electro-spinning followed by high temperature calcination. A sol-gel synthesis of monolithic three-dimensional $GeO_2$ nanostructured aero gels by controlled hydrolysis of germanium methoxide, followed by a rapid supercritical extraction of the reaction solvent acetonitrile has been reported. Sol-gel derived $GeO_2$:$SiO_2$ glassy films have been developed and spun coated on silicon or III-V substrates for optical applications. Other applications include the preparation of a $LiMn_2O_4$ thin-film electrode on a $Li_{1+x}Al_xTi_{2-x}(PO_4)_3$ solid electrolyte using a PVP sol-gel coating method; and a $Li_{1.3}Al_{0.3}Ti_{1.7}(PO_4)_3$-coated $LiMn_2O_4$ by mixing $LiMn_2O_4$ powder into a LATP coating solution and then annealing the material. Finally, LATP-polyacrylonitrile ("PAN") composite fiber based nonwoven membranes can be prepared by electro-spinning dispersions of LATP particles in PAN solutions.

Though surface modification may improve the stability of a solid electrolyte membrane in a Li-air, Li-water, and/or hybrid Li-air/Li-water cell, surface modification alone may not sufficiently contribute advantages to bulk properties, for example improved electrical conductivity. Therefore, it is desirable to modify an LATP membrane to improve its environmental stability and other bulk properties without changing the bulk composition and structure of the ceramic electrolyte.

FIG. 1 is a schematic of a lithium-air ("Li-air"), lithium-water ("Li-water"), and/or hybrid Li-air/Li-water cell 10 according to one embodiment. An anode 1 and a cathode 2 are separated by an electrolyte 3 and optionally an interlayer 4. In certain embodiments, the anode 1 is a lithium-based anode, for example a lithium metal anode. In various embodiments, the cathode 2 is selected from an air electrode, a water electrode, and a seawater electrode. In exemplary embodiments, the electrolyte 3 is a solid electrolyte. The optional interlayer 4 is a solid or liquid layer that isolates the anode 1 from substances, for example water or moisture, but that allows lithium ions to pass through.

In various embodiments, the solid electrolyte is a membrane including a polycrystalline material. The polycrystalline material is lithium-ion conductive and allows for the transport of lithium ions between the electrodes. In certain embodiments, the membrane provides physical and chemical separation of the anode from the cathode.

In certain embodiments, the solid electrolyte provides a hermetic barrier between the anode and moisture. In various exemplary embodiments, the membrane can limit the transpiration and/or diffusion of helium through the membrane to less than about $10^{-2}$ cm$^3$/m$^2$/day, or less than about $10^{-3}$ cm$^3$/m$^2$/day.

In various embodiments, the membrane has a density that is at least about 92%, at least about 95%, at least about 97%, or at least about 99% of the theoretical density of the material from which the membrane is formed. If the density of the membrane is less than about 92% of the theoretical density of the material from which the membrane is formed, the membrane may not provide a hermetic barrier or seal. In certain exemplary embodiments, the membrane has a density that is at least 95% of the theoretical density of the material from which the membrane is formed.

In certain embodiments, the membrane has a thickness of about 1 μm to about 500 μm, about 5 μm to about 400 μm, about 10 μm to about 300 μm, or about 50 μm to about 200 μm.

In various exemplary embodiments, the membrane has a conductivity of at least $1 \times 10^{-4}$ S/cm, at least $2 \times 10^{-4}$ S/cm, at least $3 \times 10^{-4}$ S/cm, at least $4 \times 10^{-4}$ S/cm, or at least $5 \times 10^{-4}$ S/cm.

In certain embodiments, the polycrystalline material comprises a lithium metal phosphate. In some exemplary embodiments, the lithium metal phosphate comprises $Li_{1+x}Al_xTi_{2-x}(PO_4)_3$, where x>0.

In various embodiments, a modified polycrystalline material comprises a polycrystalline material having at least one modified region including at least one modifying phase. In some exemplary embodiments, the modifying phase is selected from metal oxides or phosphates, wherein the metal is Ge, Al, Ca, Y, or any other metal capable of forming divalent cations, trivalent cations, quadrivalent cations, and/or pentavalent cations; and combinations thereof. In certain embodiments, the modified region is a surface and/or grain boundary. In some embodiments, the modifying phase is incorporated into the grain boundaries of the polycrystalline material. In various embodiments, the modifying phase is incorporated into a modified surface layer of the polycrystalline material.

In certain exemplary embodiments, the modifying phase comprises Ge, e.g., $GeO_2$, and the modified grain boundary and/or surface layer comprises $Li_{1+x}Al_xGe_yTi_{2-x-y}(PO_4)_3$, where 0<x<0.6 and 0<y<2.

In various exemplary embodiments, a gradient in concentration of the modifying phase exists, with the highest concentration near the surfaces, and the lowest concentration near the core of the polycrystalline material. In some embodiments, the highest concentration of the modifying phase is near a first surface, and the lowest concentration is near a second surface of the polycrystalline material. In other embodiments, the modifying phase is uniformly or nearly uniformly distributed in the grain boundaries throughout the polycrystalline material.

In some embodiments, a gradient in concentration of the modifying phase in the grain boundaries from the surface to the core of the polycrystalline material provides an advantage with respect to uniform concentrations of the modifying phase in the grain boundary for certain properties, for example environmental stability, resistance to leaching or etching in water, and/or electrical conductivity.

Various embodiments include methods of modifying the polycrystalline material. Certain embodiments of the modification process include preparing a polycrystalline material, introducing the modifying phase or a precursor thereof to at least one surface of the polycrystalline material, and heating the polycrystalline material.

In certain embodiments, the polycrystalline material is prepared by firing a lithium metal phosphate membrane. In some embodiments, this firing may change or substantially change the microstructure of the lithium metal phosphate membrane.

In various embodiments, the modifying phase is introduced to the polycrystalline material by preparing a composition comprising the modifying phase or a precursor of the modifying phase and applying the composition to the polycrystalline material to form a coated polycrystalline material. In certain embodiments, the composition is applied by dip-coating, spray-coating, spin coating, the composition onto the polycrystalline material. In other embodiments, the composition may be applied through a physical vapor deposition technique such as sputtering.

In an exemplary embodiment, the composition is a sol-gel including the modifying phase or a precursor of the modifying phase. In some embodiments, the composition includes particles, for example nanoparticles.

In various embodiments, the heating is an annealing to allow for the modifying phase to form and/or diffuse from the surface into the grain boundaries of the polycrystalline material to form modified grain boundaries.

In certain exemplary embodiments, the heating is performed for a time ranging from about 0.5-12 hours in a furnace having a temperature ranging from about 700° C. to about 1000° C.

The time and temperature of heating can influence the distribution and/or uniformity of the modifying phase in the grain boundaries and/or on the surface of the polycrystalline material.

In some embodiments, the heating may change or substantially change the microstructure of the polycrystalline material. In other embodiments, the heating does not change or substantially change the microstructure of the polycrystalline material.

Figure 2:
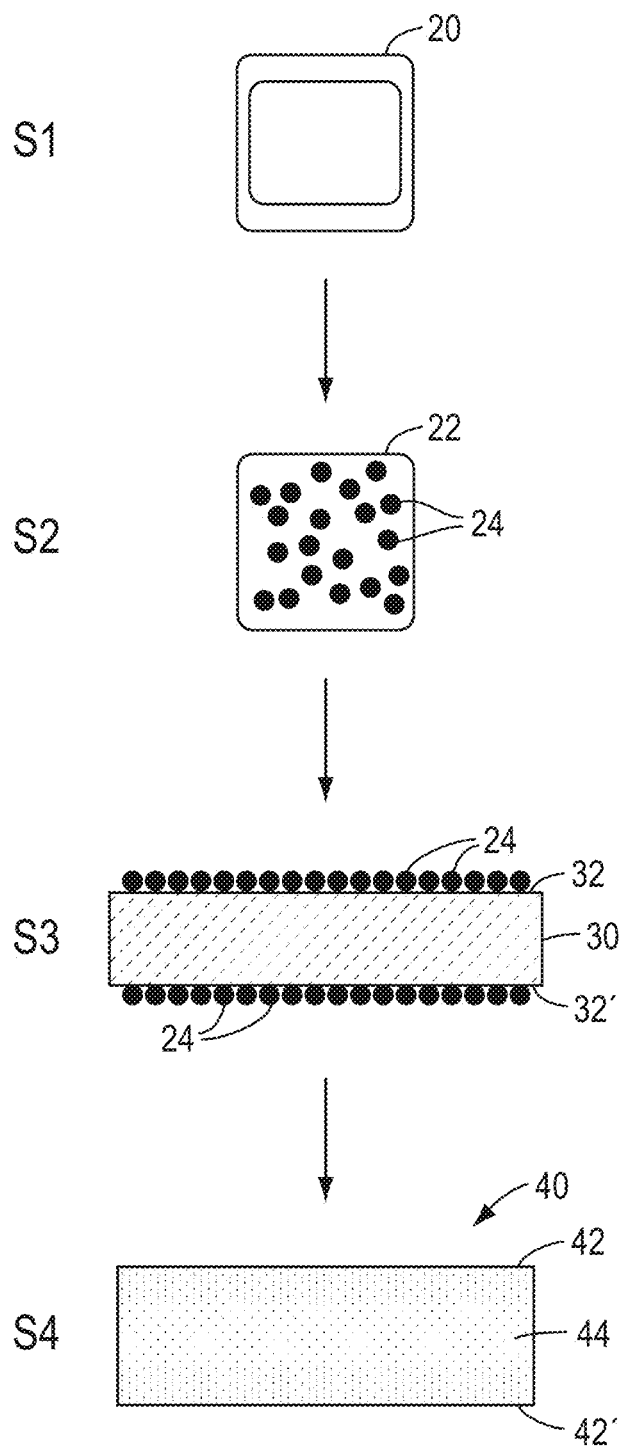
FIG. 2 is a schematic of a process for modifying a polycrystalline lithium metal phosphate material with germanium.

FIG. 2 is a schematic of a process for modifying a polycrystalline lithium metal phosphate material with germanium oxide ("GeO$_2$") nanoparticles synthesized from a sol-gel process. In Step 1, a precursor solution 20 includes germanium isopropoxide added to a mixture of ethanol and water. A condensation reaction occurs in Step 2, and GeO$_2$ nanoparticles 24 are formed in the resulting sol 22. In Step 3, a lithium metal phosphate substrate 30 is coated on one or both sides 32, 32' with the sol 22, thus forming a layer of GeO$_2$ nanoparticles 24 on the surfaces 32, 32' of the lithium metal phosphate substrate 30. The coated substrate is annealed in Step 4 to induce diffusion of Ge into the grain boundaries of the lithium metal phosphate substrate 30. The resulting modified lithium metal phosphate substrate 40 includes Ge incorporated into grain boundaries. A concentration gradient of Ge can result, with a higher concentration of Ge on the surfaces 42, 42' and within grain boundaries near the surfaces 42, 42' of the modified lithium metal phosphate substrate 40 and a lower concentration of Ge in grain boundaries near the core 44 of the modified lithium metal phosphate substrate 40.

EXAMPLES

Preparation of GeO$_2$ Nanoparticles

A nano germanium oxide ("GeO$_2$") colloid sol was prepared by the following sol-gel method. Germanium (IV) isopropoxide was added dropwise into a solution of ethanol and deionized ("DI") water, and vigorously magnetically stirred to form a slurry solution. The molar ratio of ethanol to Di water was 1:50-100:10. An amount of HCl was added into the slurry solution to adjust solution pH to about 3 to form a pH-adjusted solution. The pH-adjusted solution was covered and stirred continuously for 24 hours at room temperature to form a sol solution. A sample was prepared by drying a drop of sol solution on an aluminum scanning electron microscope ("SEM") stub and drying in an oven for about 10 minutes at 50° C. A conductive carbon coating was evaporated onto the sample to reduce charging. The morphology of as-prepared germanium oxide was observed on a Zeiss 1550VP SEM.

Figure 3A:
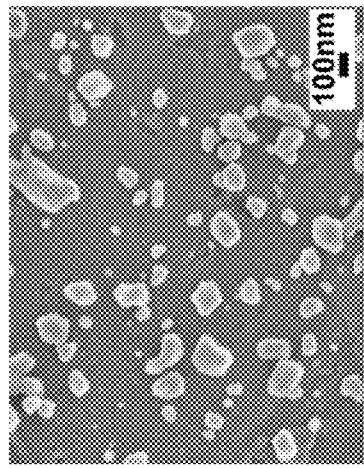
FIG. 3A and FIGS. 3B show SEM images, and 3C shows energy-dispersive X-ray spectroscopy ("EDX") spectra of $GeO_2$ nanoparticles synthesized from a sol-gel method.
Figure 3B:
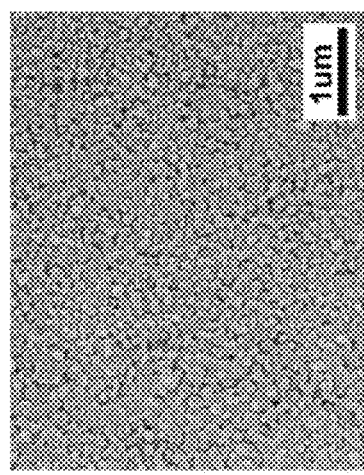
Figure 3C:
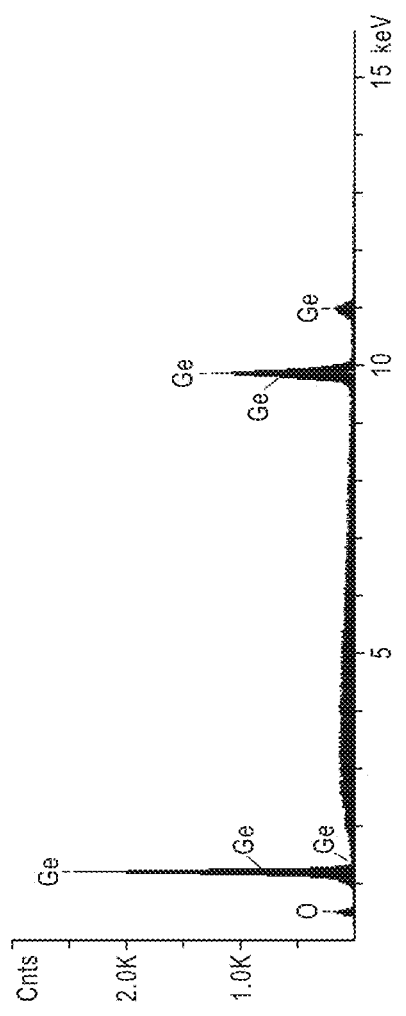

FIGS. 3 (*a*) and (*b*) show SEM images and (*c*) energy-dispersive X-ray spectroscopy ("EDX") spectra of GeO$_2$ nanoparticles synthesized from a sol-gel method. FIG. 3*a* shows a representative image of agglomeration of densely packed particles, and further shows a large scale production of nanoparticles synthesized from a sol-gel process. This suggests that the synthesis of GeO$_2$ nanoparticles using a sol-gel process is scalable, for example to manufacturing on a large scale. FIG. 3*b* shows that the as-prepared individual nanoparticle size ranges from about 20 nm to about 100 nm. FIG. 3*c* shows the presence of only Ge and O in the nanoparticles, which indicates that the composition of the as-prepared sol is germanium oxide.

Comparative Example 1

A 150 micron thick polycrystalline membrane was prepared by tape casting Li$_{1.4}$Al$_{0.4}$Ti$_{1.6}$(PO$_4$)$_3$ ("LATP") powder. The membrane was sintered at 900° C. for 2 hours.

Example 1

The germanium sol solution was dip-coated onto the polycrystalline LATP material of Comparative Example 1 by dipping the LATP material in the sol solution for about 5 minutes, and withdrawing the LATP material from the sol solution at a rate of about 6 to about 30 mm/min. The dip-coated LATP was dried in air for at least 1 hour at 50° C. The dried coated LATP material was annealed in a furnace at 850° C. for about 2 hours to allow germanium oxide nanoparticles to react with the LATP to form lithium aluminum germanium titanium phosphate ("LAGTP") on the surface and within the grain boundaries of the LATP material.

Figure 4A:
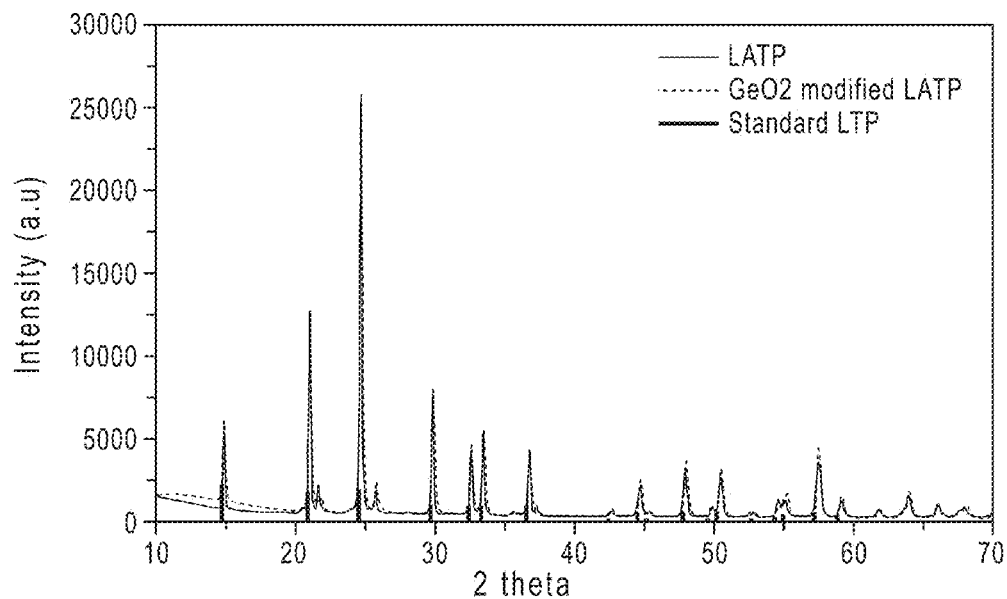
FIGS. 4A and 4B show graphs of the X-ray diffraction ("XRD") patterns taken on the surface of unmodified and modified LATP materials according to Comparative Example 1 and Example 1.
Figure 4B:
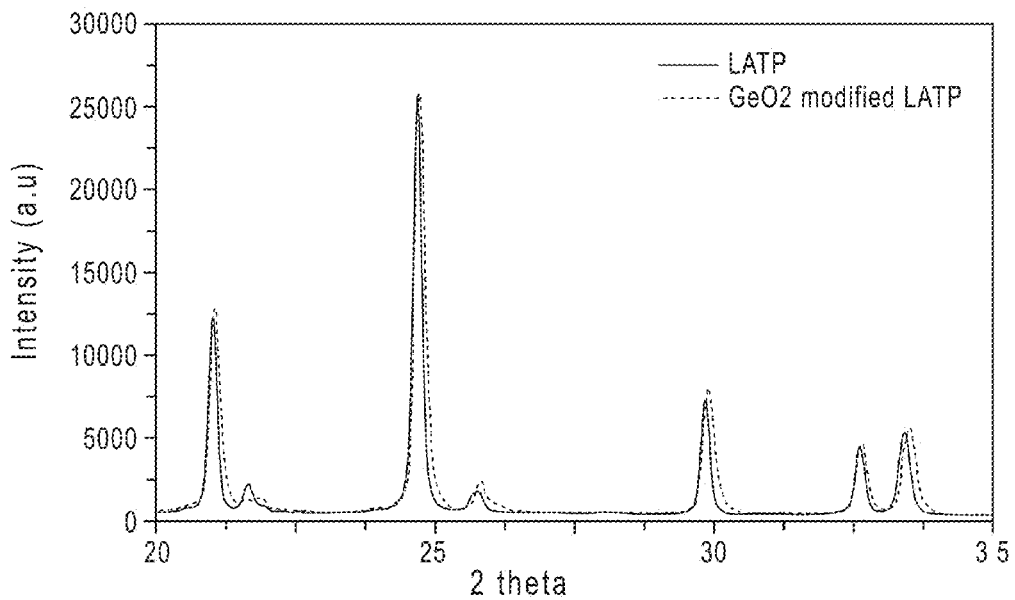

Compositions of LATP before (Comparative Example 1) and after modification by Ge (Example 1) were characterized using a Bruker D4 Endeavor X-ray diffractometer, power settings at 40 kV 40 mA. FIGS. 4*a* and 4*b* show graphs of the X-ray diffraction ("XRD") patterns taken on the surface of unmodified and modified LATP materials according to Comparative Example 1 and Example 1. As shown in FIG. 4*a*, the Ge-modified LATP surface of Example 1 exhibits similar diffraction patterns with the unmodified LATP sample of Comparative Example 1, and both can be readily indexed as LiTi$_2$(PO4)$_3$ rhombohedral phase (R3c) (PCPDF #01-072-6140). FIG. 4*b* shows that that the Ge-modified LATP surface of Example 1 has a slight peak shift towards a smaller lattice parameter compared to Comparative Example 1. The calculated lattice constants a and c, and calculated cell volume of Example 1 and Comparative Example 1 are shown in Table 1. Example 1 exhibits a unit cell volume decrease of about 0.6% as compared to Comparative Example 1, which suggests that a thin LAGTP coating was formed on LATP surface.

TABLE 1

| Sample | Lattice constant a Å | Lattice constant c Å | Calculated cell volume Å$^3$ |
|---|---|---|---|
| Example 1 | 8.48 | 20.80 | 1295 |
| Comparative Example 1 | 8.49 | 20.87 | 1303 |

FIG. 5 shows SEM images of the surface of a) unmodified LATP materials according to Comparative Example 1 and b) modified LATP materials according to Example 1 and SEM images of a fractured cross section of c) unmodified LATP materials according to Comparative Example 1 and d) modified LATP materials according to Example 1. As seen in FIG. 5, the modified LATP of Example 1, shown in b) and d), did not show obvious morphological differences on or between the membrane crystals when compared with the unmodified LATP of Comparative Example 1, shown in a) and c). Both the surface, shown in a) and b), and cross section, shown in c) and d) have similar crystal morphologies and structures in Example 1 and Comparative Example 1.

Figure 6A:
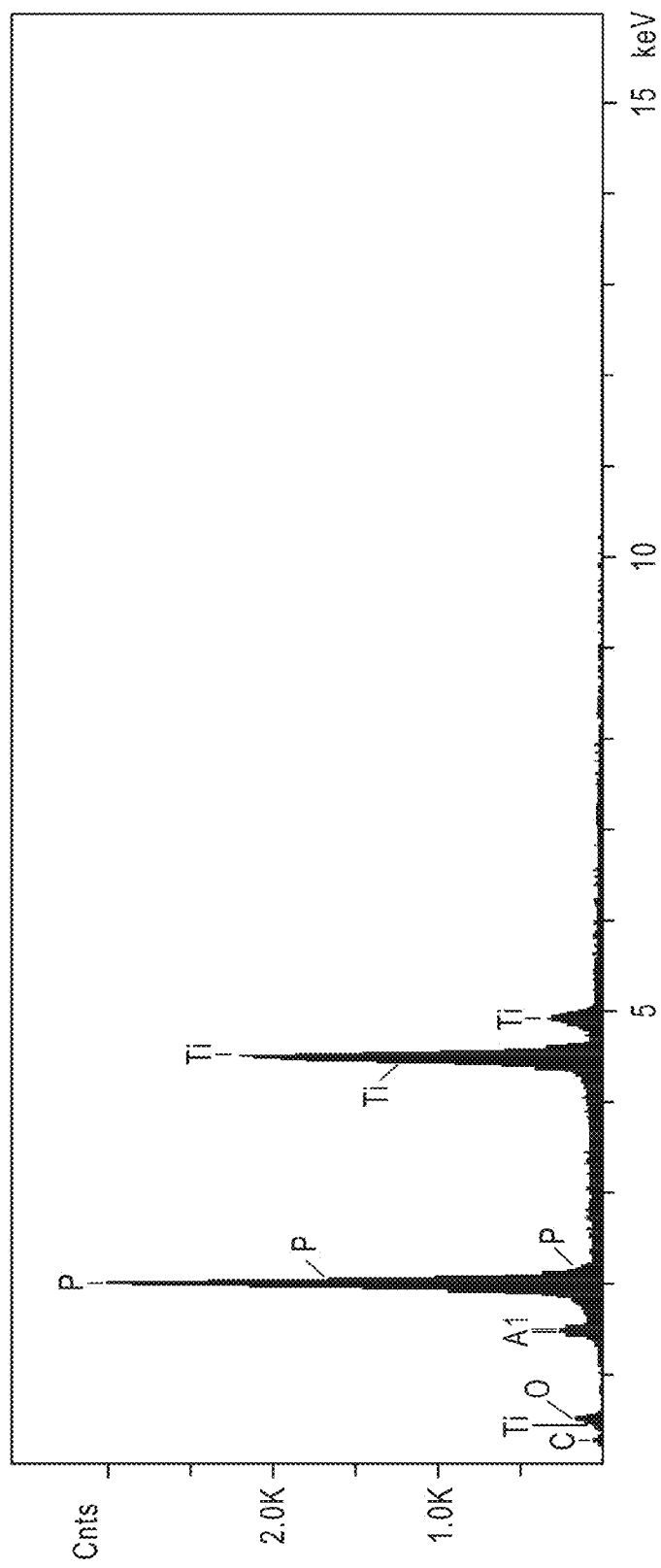
FIG. 6A-6B shows EDX spectra of the surface of a) unmodified and b) modified LATP materials according to Comparative Example 1 and Example 1.
Figure 6B:
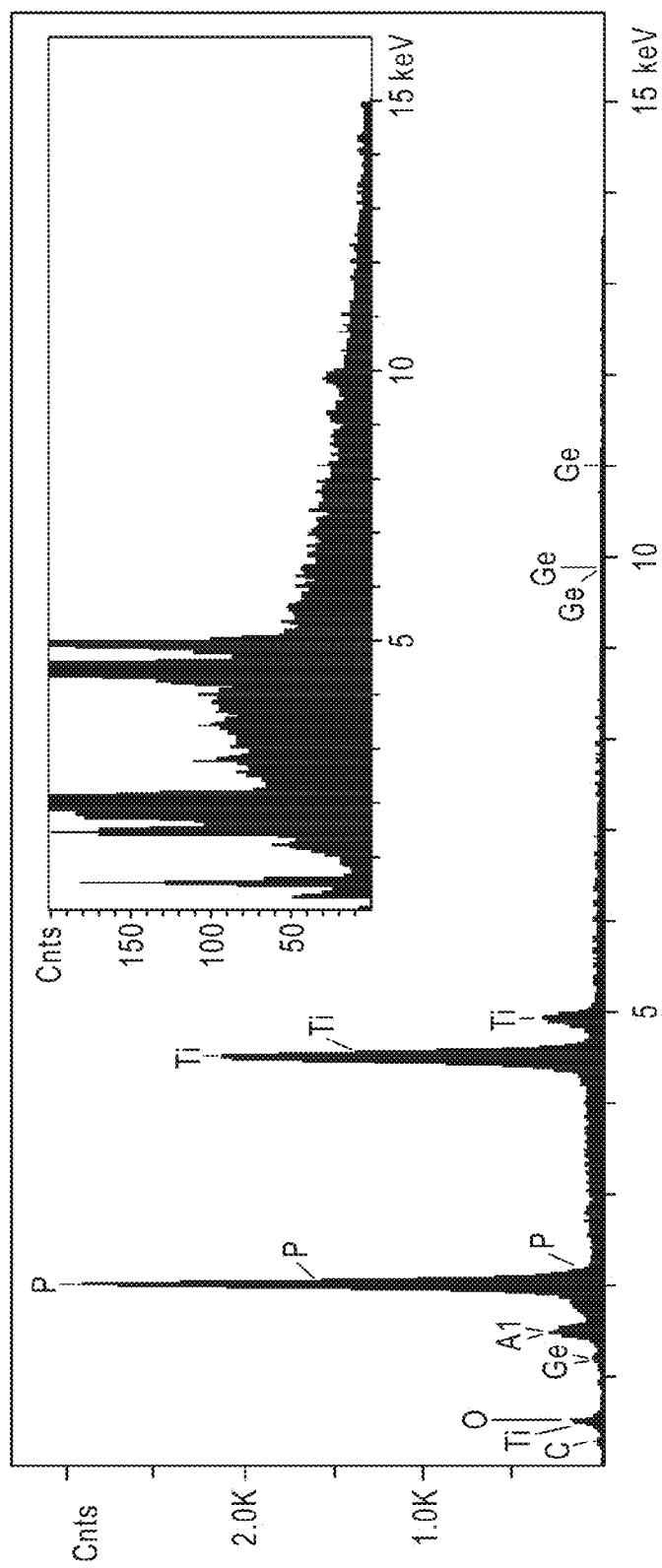

FIG. 6 shows energy-dispersive X-ray spectroscopy ("EDX") spectra of the surface of a) unmodified and b) modified LATP materials according to Comparative Example 1 and Example 1. The EDX analyses detected germanium at the surface of the modified LATP of Example 1, shown in a), but no germanium was detected on the surface of the unmodified LATP of Comparative Example 1, shown in b).

Figure 7A:
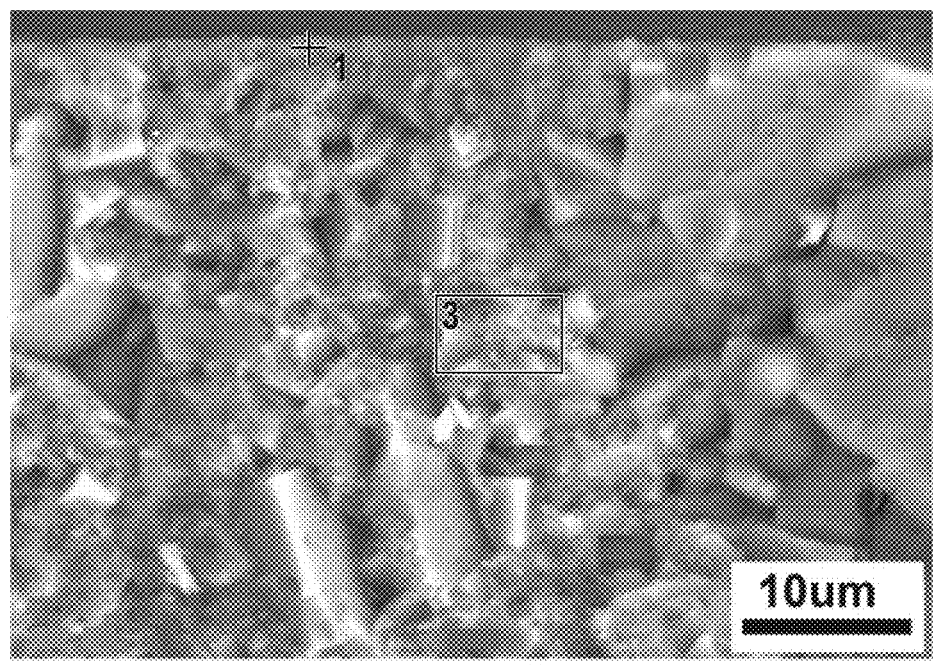
FIG. 7A-7C shows a) an SEM image and EDX spectra of b) area 1 and c) area 3 of a fractured cross section of the modified LATP material according to Example 1.
Figure 7B:
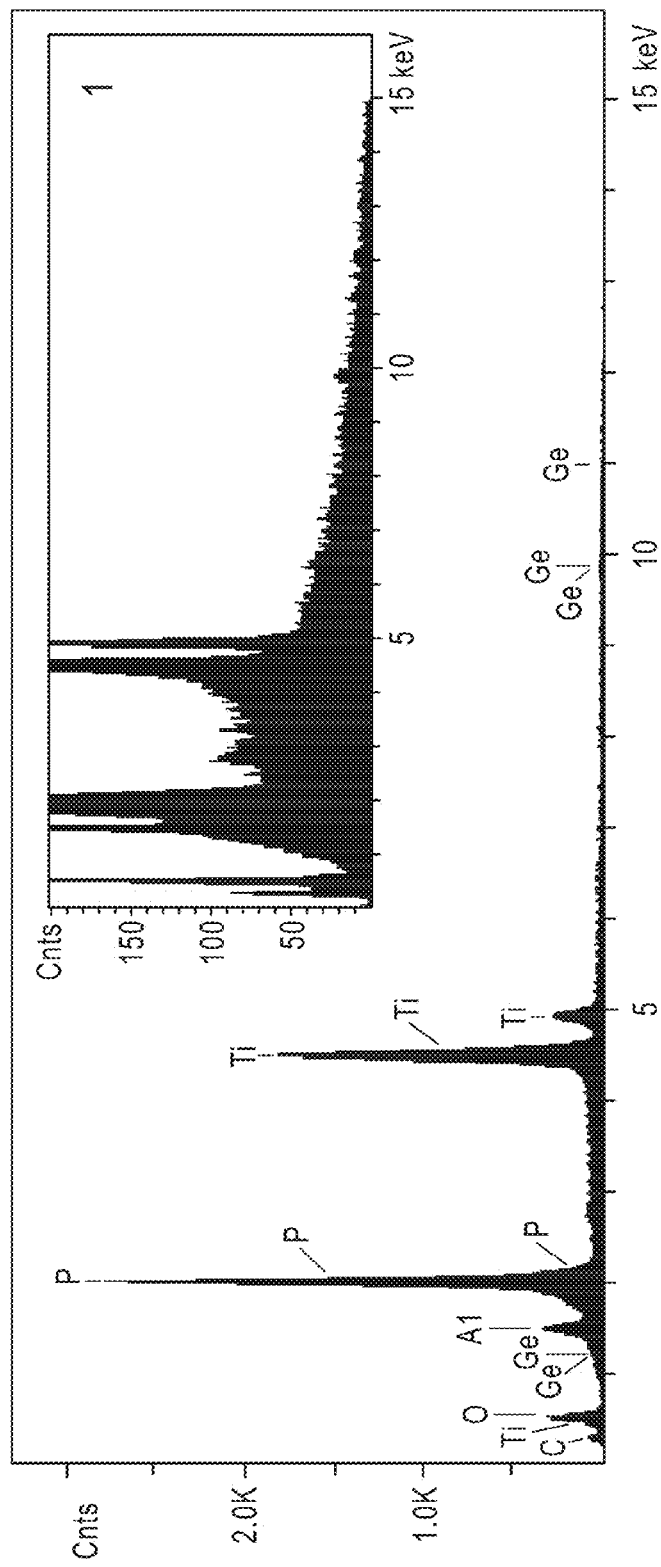
Figure 7C:
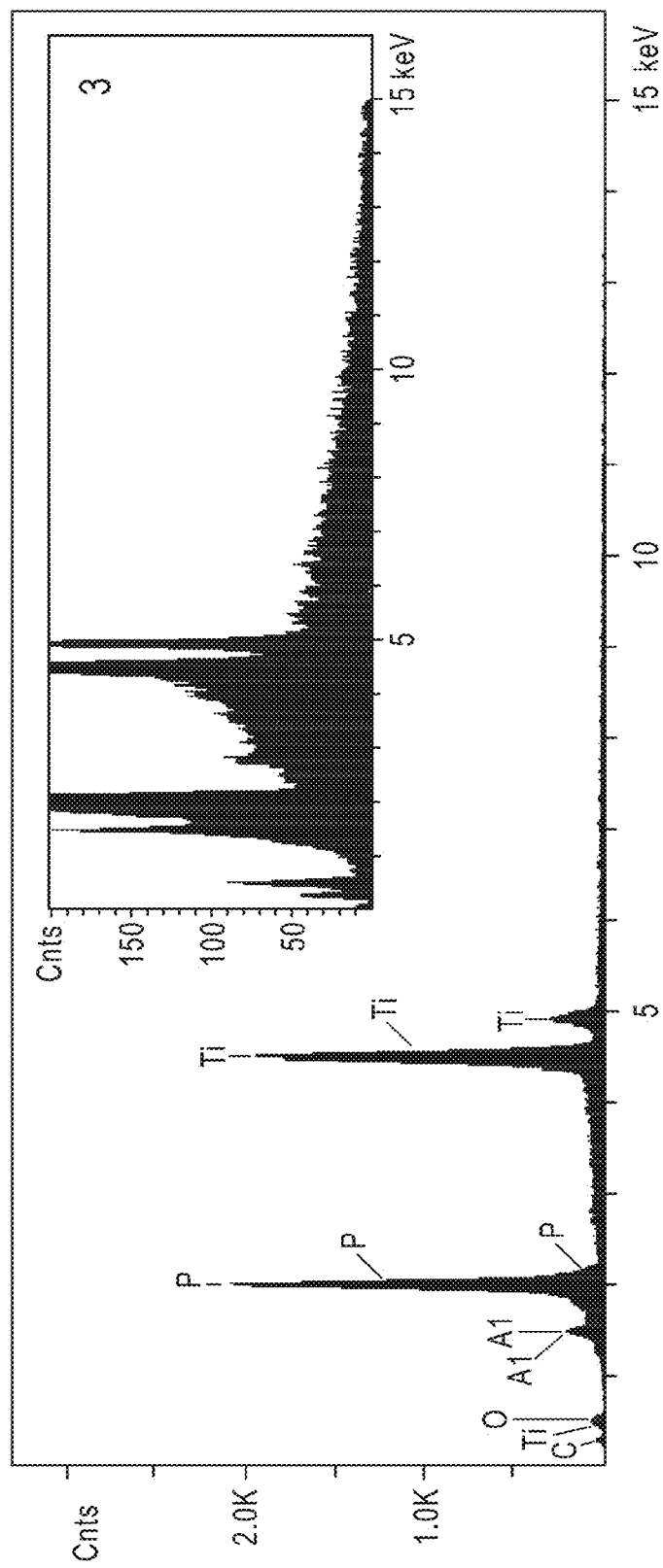

EDX analysis performed on the fractured cross section of the modified LATP of Example 1 is shown in FIG. 7. FIG. 7*a* shows an SEM image of a fractured cross section of the modified LATP material according to Example 1. EDX spectra of areas 1 and 3 as marked on FIG. 7*a* are shown in FIGS. 7*b* and 7*c*, respectively. Germanium was detected in area 1 sampled close to surface of the modified LATP of Example 1, but germanium was not detected by EDX greater than about 15 μm from the surface of the modified LATP. The EDX results shown in FIGS. 6 and 7 are in good agreement with XRD observation of only slight peak shift shown in FIG. 4, which suggests a very thin layer of LAGTP on the surface of the modified LATP. The EDX data collected from area 2 (not shown) were similar to the data from area 1.

Because the degradation of a solid electrolyte due to water or moisture exposure can be caused by dissolution, stability of Example 1 and Comparative Example 1 was determined by exposing the polycrystalline materials to deionized water and measuring the conductivity of the resulting leachate. Dissolved polycrystalline materials can increase the conductivity of the leachate. Substantial increases in leachate conductivity indicate that the sample is considered unstable in water. Lower leachate conductivity indicates less dissolution in water, which suggests less degradation of the polycrystalline material when used as a solid electrolyte within a lithium-air or lithium-water cell. Therefore, lower leachate conductivity suggest a more stable electrolyte material. In the leaching experiment, about 50 mg of modified and unmodified LATP membranes of Example 1 and Comparative Example 1, respectively, were immersed in about 30 ml deionized water ("DI $H_2O$"), and then the conductivities of leachates were measured over time.

Figure 8:
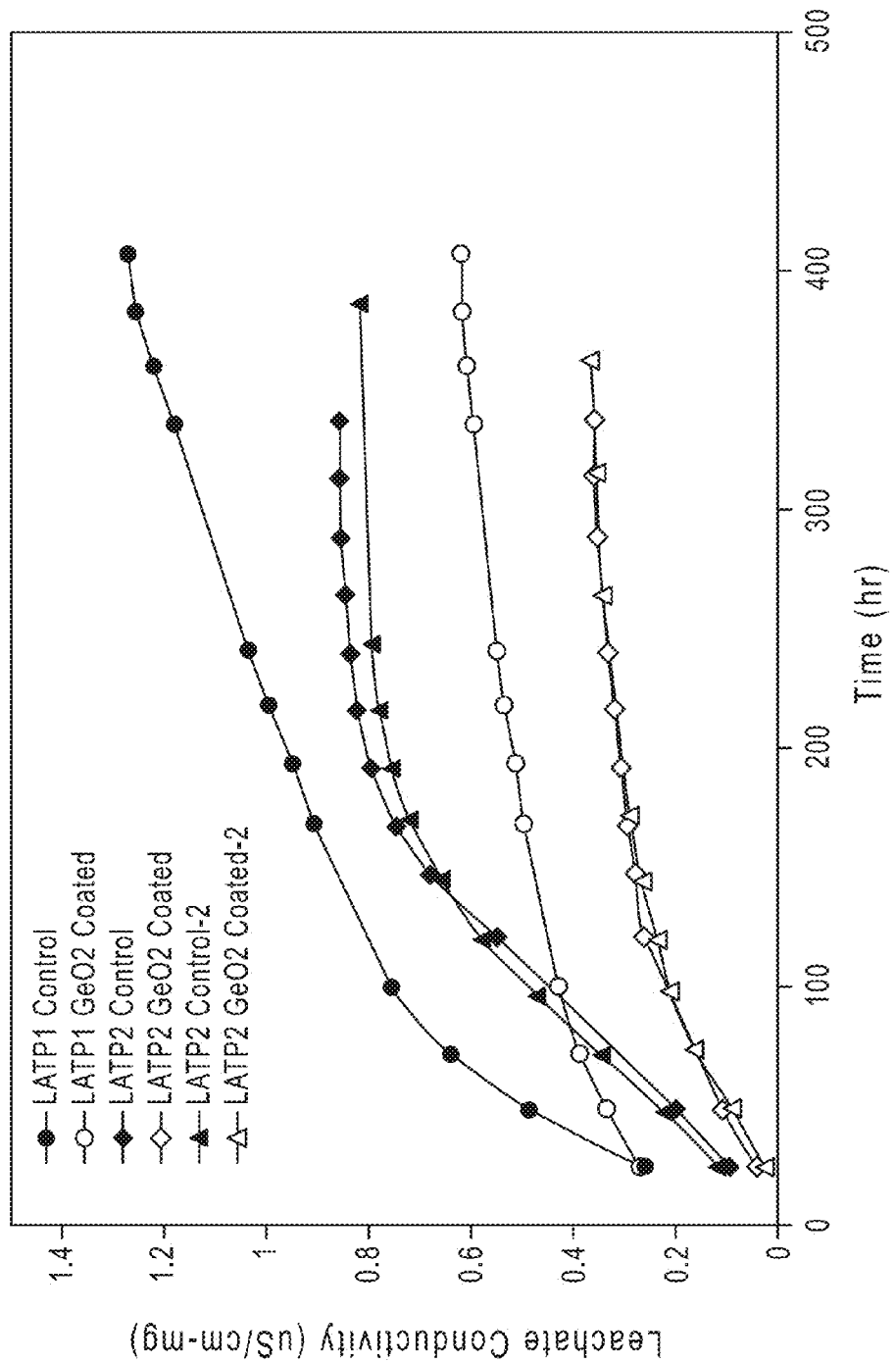
FIG. 8 shows time-dependent leachate conductivities in deionized water for three unmodified and three modified LATP materials according to Comparative Example 1 and Example 1.

FIG. 8 shows time-dependent leachate conductivities in deionized water for unmodified and modified LATP materials (three samples each) according to Comparative Example 1 and Example 1. As shown in FIG. 8, modified LATP of Example 1 exhibits decreased leachate conductivity compared to unmodified LATP of Comparative Example 1. After immersion in DI $H_2O$ for about 400 hours, the leachate conductivity for LATP1 decreased by about 50.8%, and the leachate conductivity for LATP2 decreased by about 58.3% between the modified and unmodified samples. After about 700 hours of immersion in DI $H_2O$, modified LATP1 exhibited a decrease in leachate conductivity by about 54.3% as compared to the unmodified LATP1 (not shown). The leaching test results indicate that the disclosed surface and/or grain boundary modification of a polycrystalline material is a useful approach to improve stability in aqueous or moist environments.

Figure 9:
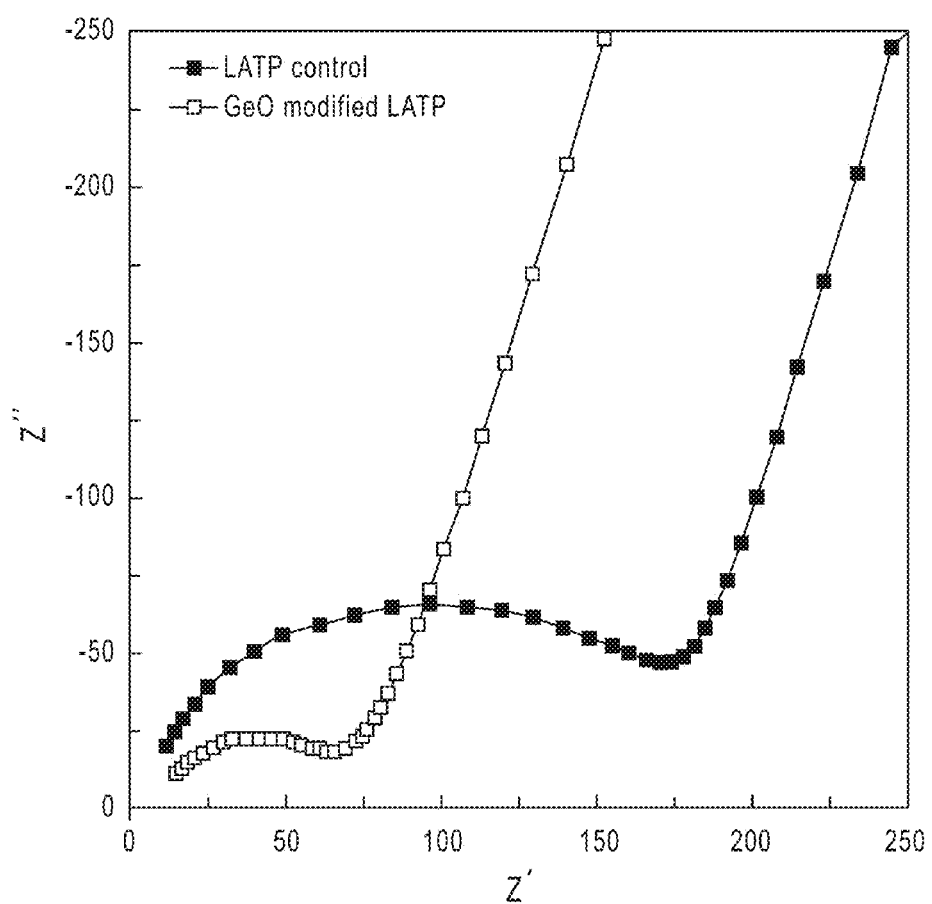
FIG. 9 is a graph showing the AC impedance for unmodified and modified LATP materials according to Comparative Example 1 and Example 1.

FIG. 9 is a graph showing the AC impedance for unmodified and modified LATP materials according to Comparative Example 1 and Example 1. As shown in FIG. 9 and Table 2, a total lithium ion conductivity measured by impedance spectroscopy for the modified LATP of Example 1 was substantially higher compared with the unmodified LATP of Comparative Example 1. The modified LATP2 material in Table 2 exhibited a 20% increase in conductivity compared to the unmodified LATP2 material.

TABLE 2

| Sample | Conductivity S/cm |
|---|---|
| Example 1 | $3.04 \times 10^{-4}$ |
| Comparative Example 1 | $5.71 \times 10^{-5}$ |
| Modified LATP2 | $1.41 \times 10^{-4}$ |
| Unmodified LATP2 | $1.17 \times 10^{-4}$ |

As used herein, the terms "a", "an", and "the" are intended to encompass the plural as well as the singular. In other words, for ease of reference only, the terms "a" or "an" or "the" may be used herein, such as "a polycrystalline material", "an element", "the cathode", etc., but are intended, unless explicitly indicated to the contrary, to mean "at least one," such as "at least one polycrystalline material", "at least one element", "the at least one cathode", etc. This is true even if the term "at least one" is used in one instance, and "a" or "an" or "the" is used in another instance, e.g. in the same paragraph or section. Furthermore, as used herein, the phrase "at least one" means one or more, and thus includes individual components as well as mixtures and/or combinations.

The term "comprising" (and its grammatical variations) as used herein is used in the inclusive sense of "having" or "including," with which it may be used interchangeably. These terms are not to be construed as being used in the exclusive sense of "consisting only of" unless explicitly so stated.

Other than where expressly indicated, all numbers expressing quantities of ingredients and/or reaction conditions are to be understood as being modified in all instances by the term "about." This includes terms such as "all" or "none" and variants thereof. As used herein, the modifier "about" means within the limits that one of skill in the art would expect with regard to the particular quantity defined; this may be, for example, in various embodiments, ±10% of the indicated number, ±5% of the indicated number, ±2% of the indicated number, ±1% of the indicated number, ±0.5% of the indicated number, or ±0.1% of the indicated number.

Additionally, where ranges are given, it is understood that the endpoints of the range define additional embodiments, and that subranges including those not expressly recited are also intended to include additional embodiments.

As used herein, "formed from," "generated by," and variations thereof, mean obtained from chemical reaction of, wherein "chemical reaction," includes spontaneous chemical reactions and induced chemical reactions. As used herein, the phrases "formed from" and "generated by" are open ended and do not limit the components of the composition to those listed.

The compositions and methods according to the present disclosure can comprise, consist of, or consist essentially of the elements and limitations described herein, as well as any additional or optional ingredients, components, or limitations described herein or otherwise known in the art.

It should be understood that, unless explicitly stated otherwise, the steps of various methods described herein may be performed in any order, and not all steps must be performed, yet the methods are still intended to be within the scope of the disclosure.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A polycrystalline lithium-ion conductive membrane comprising:
   a polycrystalline lithium-ion conductive material comprising grain boundaries and a lithium metal phosphate comprising $Li_{1+x}Al_xTi_{2-x}(PO_4)_3$ where x>0, and at least one modifying phase comprising at least one oxide or phosphate of Ge, Ca, Y, Si, Mg, or Ga; and
   wherein the at least one modifying phase is incorporated into the grain boundaries to form a modified polycrystalline lithium-ion conductive material comprising modified grain boundaries.

2. The polycrystalline lithium-ion conductive membrane of claim 1, wherein the modified polycrystalline lithium-ion conductive material exhibits one of (c) a lower rate of etching by water than the polycrystalline lithium-ion conductive material, (d) a higher electrical conductivity than the polycrystalline lithium-ion conductive material, or both (c) and (d).

3. The polycrystalline lithium-ion conductive membrane of claim 1, wherein the modified grain boundaries exhibit a lower rate of etching by water than the grain boundaries of the polycrystalline lithium-ion conductive material.

4. The polycrystalline lithium-ion conductive membrane of claim 1, wherein the modified grain boundaries comprise $Li_{1+x}Al_xGe_yTi_{2-x-y}(PO_4)_3$, where $0<x<0.6$ and $0<y<2$.

5. The polycrystalline lithium-ion conductive membrane of claim 1, wherein the at least one modifying phase is incorporated into at least one surface of the polycrystalline lithium-ion conductive membrane to form a modified surface.

6. The polycrystalline lithium-ion conductive membrane of claim 5, wherein the polycrystalline lithium-ion conductive membrane comprises two modified surfaces located on two opposite surfaces of said modified polycrystalline lithium-ion conductive membrane to form a structure having a modifying phase concentration gradient, wherein the concentration is higher at said opposite surfaces than at a center of the structure.

7. The polycrystalline lithium-ion conductive membrane of claim 1, wherein the polycrystalline lithium-ion conductive material exhibits a density of at least 92% of a theoretical density of the polycrystalline lithium-ion conductive material.

8. The polycrystalline lithium-ion conductive membrane of claim 1, wherein the polycrystalline lithium-ion conductive membrane has a thickness ranging from about 5 µm to about 500 µm.

9. The polycrystalline lithium-ion conductive membrane of claim 1, wherein the polycrystalline lithium-ion conductive membrane is hermetic and diffusion of helium through the polycrystalline lithium-ion conductive membrane is less than about $10^{-2}$ $cm^3/m^2/day$.

10. The polycrystalline lithium-ion conductive membrane of claim 1, wherein the polycrystalline lithium-ion conductive membrane has a conductivity of greater than about $10^{-4}$ S/cm.

11. A lithium battery comprising:
an anode comprising lithium;
a cathode; and
the polycrystalline lithium-ion conductive membrane of claim 1 located between the anode and cathode.

12. The lithium battery of claim 11, wherein the lithium battery is selected from lithium ion batteries, lithium-air batteries, lithium-water batteries, and combinations thereof.

13. The polycrystalline lithium-ion conductive membrane of claim 1, wherein the at least one modifying phase is incorporated into the grain boundaries near a surface of the polycrystalline lithium ion-conductive membrane and into the grain boundaries near a core of the polycrystalline lithium-ion conductive membrane.

14. The polycrystalline lithium-ion conductive membrane of claim 1, wherein the at least one modifying phase is distributed in the grain boundaries throughout the polycrystalline lithium-ion conductive membrane.

15. A polycrystalline lithium-ion conductive membrane comprising:
a polycrystalline lithium-ion conductive material including grain boundaries and comprising $Li_{1+x}Al_xTi_{2-x}(PO_4)_3$, where $x>0$; and
at least one modifying phase comprising Ge,
wherein (a) the at least one modifying phase is incorporated into the grain boundaries of the polycrystalline lithium-ion conductive material to form modified grain boundaries, (b) the at least one modifying phase is incorporated into at least one surface of the polycrystalline lithium-ion conductive membrane to form a modified surface, or both (a) and (b).

16. The polycrystalline lithium-ion conductive membrane of claim 15, wherein the modified grain boundaries or modified surface comprise $Li_{1+x}Al_xGe_yTi_{2-x-y}(PO_4)_3$, where $0<x<0.6$ and $0<y<2$.

17. A method for modifying the polycrystalline lithium-ion conductive membrane of claim 1, the method comprising:
preparing a composition comprising the modifying phase or a precursor of the modifying phase;
forming a coated polycrystalline lithium-ion conductive membrane by applying the composition to at least one surface of the polycrystalline lithium-ion conductive membrane; and
annealing the coated polycrystalline lithium-ion conductive membrane to form the modified polycrystalline lithium-ion conductive membrane having (a) a modified surface comprising the modifying phase, (b) the modified grain boundaries comprising the modifying phase, or both (a) and (b).

18. The method of claim 17, wherein the polycrystalline lithium-ion conductive material comprises lithium metal phosphate, and wherein the modifying phase comprises Ge.

19. The method of claim 17, wherein the composition comprises $GeO_2$ particles made by a sol-gel process using a germanium isopropoxide precursor.

20. The method of claim 19, wherein the $GeO_2$ particles have an average particle size ranging from 20-100 nm.

21. The method of claim 17, wherein the step of applying the composition comprises dip-coating the composition onto the polycrystalline lithium-ion conductive membrane.

22. The method of claim 17, further comprising drying the coated polycrystalline lithium-ion conductive membrane prior to the annealing.

23. The method of claim 17, wherein the annealing is performed for a time ranging from about 0.5 to 12 hours in a furnace having a temperature ranging from about 700° C. to about 1000° C.

* * * * *

UNITED STATES PATENT AND TRADEMARK OFFICE
CERTIFICATE OF CORRECTION

Page 1 of 1

PATENT NO. : 9,905,883 B2
APPLICATION NO. : 13/852491
DATED : February 27, 2018
INVENTOR(S) : Michael Edward Badding et al.

It is certified that error appears in the above-identified patent and that said Letters Patent is hereby corrected as shown below:

On the Title Page

On page 2, Column 1, item (56), Other Publications, Line 9, delete "$Li_{1+x}Al_xTi_{2-4}(PO_4)_3$" and insert -- $Li_{1+x}Al_xTi_{2-x}(PO_4)_3$ --, therefor.

In the Claims

In Column 12, Line 57, Claim 1, delete "$Li_{1+x}Al_xTi_{2-x}(PO_4)_3$" and insert -- $Li_{1+x}Al_xTi_{2-x}(PO_4)_3,$ --, therefor.

Signed and Sealed this
Tenth Day of December, 2019

Andrei Iancu
*Director of the United States Patent and Trademark Office*